United States Patent
Nihei et al.

(10) Patent No.: US 8,251,870 B2
(45) Date of Patent: Aug. 28, 2012

(54) IDLING-STOP CANCELLATION CONTROL APPARATUS OF VEHICLE DRIVING SYSTEM

(75) Inventors: Hironori Nihei, Isehara (JP); Masato Koga, Hiratsuka (JP); Takashi Matsuda, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 702 days.

(21) Appl. No.: 12/418,788

(22) Filed: Apr. 6, 2009

(65) Prior Publication Data

US 2009/0298644 A1 Dec. 3, 2009

(30) Foreign Application Priority Data

Jun. 3, 2008 (JP) ................................ 2008-145230

(51) Int. Cl.
*B60W 10/04* (2006.01)
(52) U.S. Cl. ...................................................... 477/107
(58) Field of Classification Search .................. 477/101, 477/107, 110, 174, 906; 701/112, 54, 62, 701/76
See application file for complete search history.

(56) References Cited

U.S. PATENT DOCUMENTS

| | | | | |
|---|---|---|---|---|
| 7,192,372 | B2 * | 3/2007 | Sawada | 474/28 |
| 7,815,545 | B2 * | 10/2010 | Nakashima et al. | 477/138 |
| 2006/0189436 | A1 | 8/2006 | Nakashima et al. | |
| 2011/0071740 | A1 * | 3/2011 | Nihei et al. | 701/54 |

FOREIGN PATENT DOCUMENTS

| | | |
|---|---|---|
| JP | 6-167229 A | 6/1994 |
| JP | 2003-172444 A | 6/2003 |
| JP | 2006-220114 A | 8/2006 |
| JP | 2006-234013 A | 9/2006 |

* cited by examiner

*Primary Examiner* — David D Le
*Assistant Examiner* — David J Hlavka
(74) *Attorney, Agent, or Firm* — Foley & Lardner LLP

(57) ABSTRACT

In an idling-stop cancellation control apparatus of a vehicle driving system of an idling-stop control device equipped automotive vehicle capable of running by a power produced by an engine and transmitted via a transmission whose shift is controlled by a hydraulic pressure produced by an engine-driven oil pump during operation of the engine, a controller is configured to execute, based on engine speed, idling-stop cancellation control by which the vehicle driving system is put into an output torque state suited for vehicle-driving operation, when a hydraulic pressure sensor system provided for detecting a hydraulic pressure used for shift control of the transmission is failed. The controller is further configured to execute, based on the hydraulic pressure, idling-stop cancellation control by which the vehicle driving system is put into an output torque state suited for vehicle-driving operation, when the hydraulic pressure sensor system is unfailed.

17 Claims, 5 Drawing Sheets

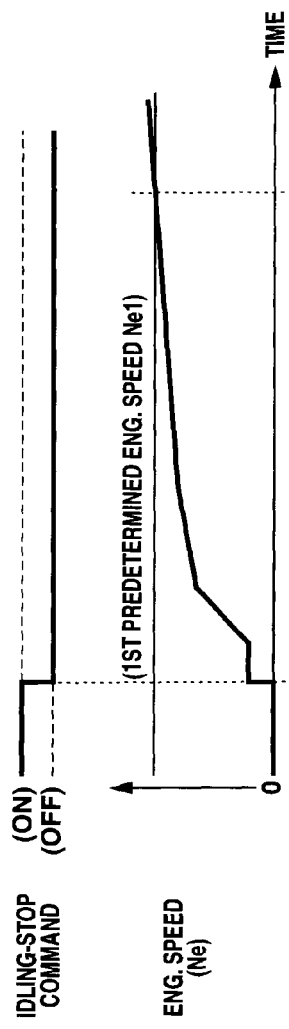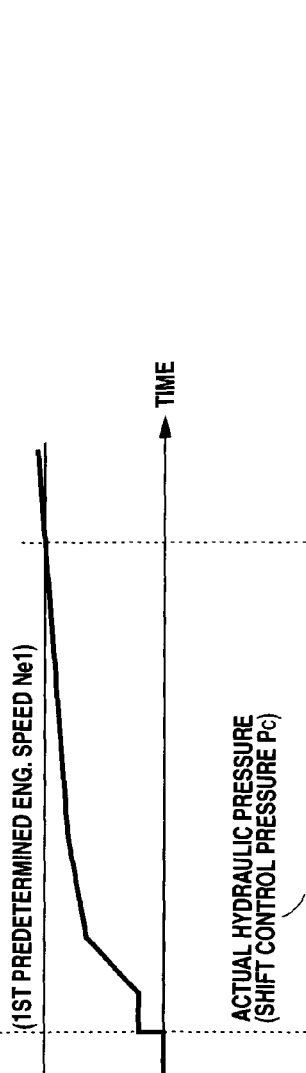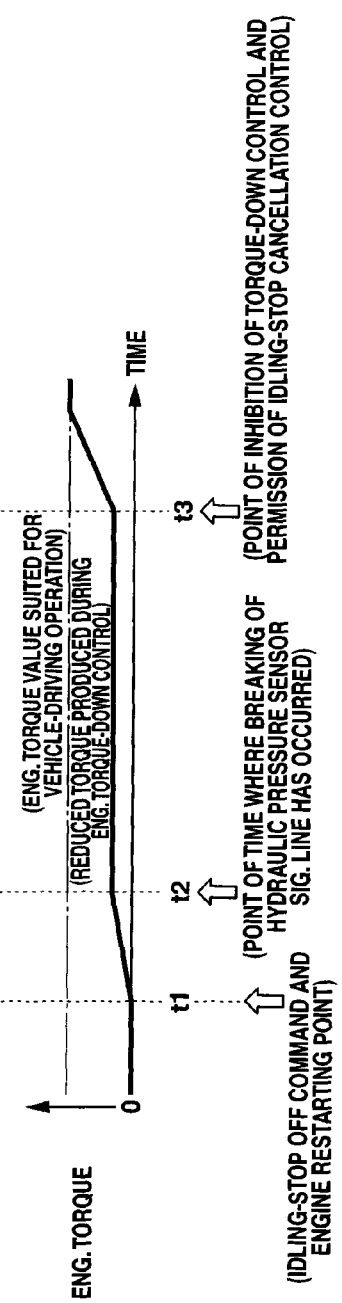

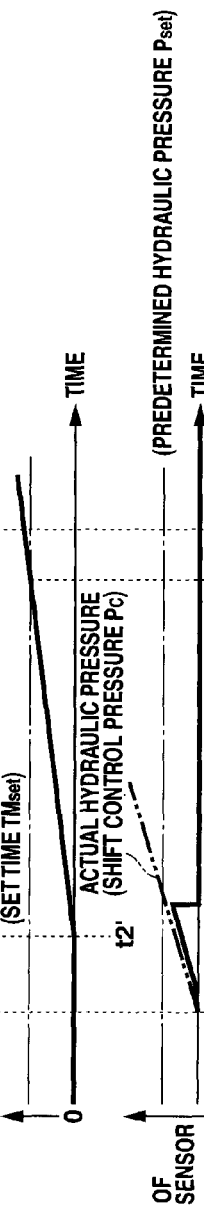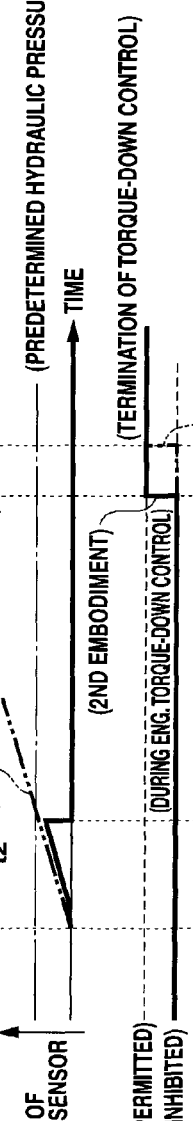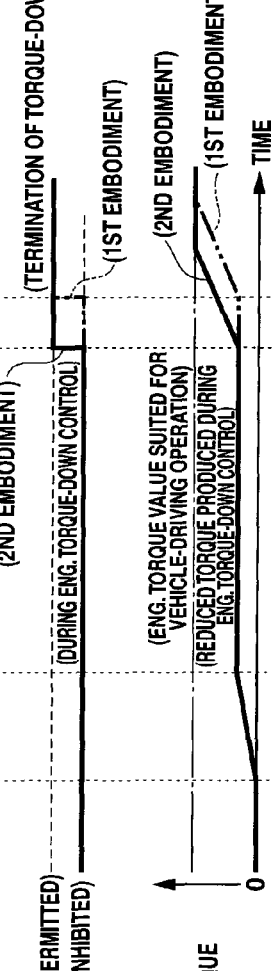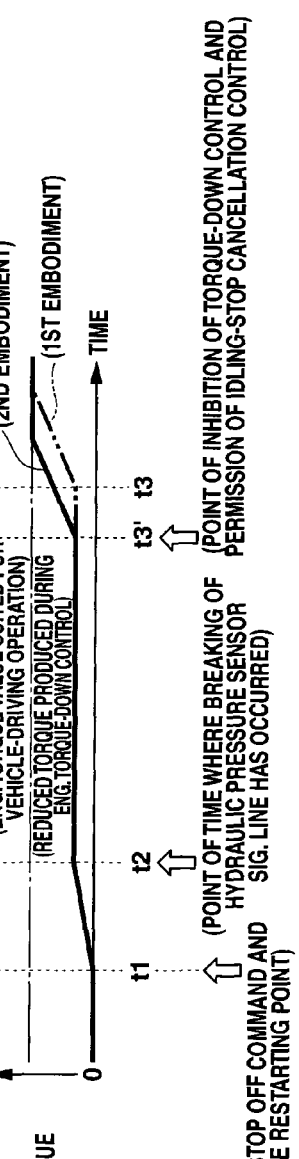

IDLING-STOP CANCELLATION CONTROL APPARATUS OF VEHICLE DRIVING SYSTEM

TECHNICAL FIELD

The present invention relates to an idling-stop control device equipped automotive vehicle configured to run by a power produced by an engine and transmitted via a transmission and to execute idling-stop operation by which the engine is automatically stopped when a predetermined condition is satisfied under a state where a stop of the vehicle has been decided, and further configured to inhibit the idling-stop operation to restart the engine when the predetermined condition becomes unsatisfied, thereby putting a vehicle driving system into a state suited for vehicle-driving operation, and specifically to an idling-stop cancellation control apparatus configured to accurately execute idling-stop cancellation control after the idling-stop operation has been inhibited.

BACKGROUND ART

In order to improve fuel economy of an automotive vehicle, there have been proposed and developed various "idling-stop" control techniques in which an engine is automatically stopped at a stop of the vehicle, when a predetermined condition is satisfied, for example, when a vehicle stopping state, in which the driver has no intention of starting the vehicle, continues for a preset time duration. According to such an idling-stop control technique, in the presence of the driver's operation corresponding to the driver's intention of starting the vehicle, for instance when the brakes are released and thus the brake system is changed from operative to inoperative, the engine is automatically restarted by inhibiting "idling-stop" operation.

On the other hand, a shift (an upshift or a downshift) of a transmission is controlled by hydraulic pressure produced by an engine-driven oil pump driven by the engine. Generally, during the previously-noted "idling-stop" operation, the engine is kept inoperative and thus there is no hydraulic-pressure supply from the engine-driven oil pump to a transmission control hydraulic unit. Hence, the transmission is kept in a disabling state of power transmission.

When the engine is restarted by inhibiting "idling-stop" operation under such a power-transmission disabling state, there is a supply of hydraulic pressure produced by the engine-driven oil pump to the transmission control hydraulic unit. Thus, a transition of the transmission to an enabling state of power transmission occurs, but there is a response delay between the engine restarting point and the time when the transmission has been changed to the power-transmission enabling state by hydraulic pressure produced by the engine-driven oil pump.

Assume that such "idling-stop" operation is inhibited to put the vehicle driving system (containing the engine) into a state suited for vehicle-driving operation during a time period corresponding to the above-mentioned response delay. In such a case, engine power output, rising as a result of the "idling-stop" inhibition, would be undesirably inputted to the transmission, not yet changed to the power-transmission enabling state but remaining kept in the power-transmission disabling state, thereby deteriorating the durability of the transmission.

To avoid this, another idling-stop control technique teaches the use of an electric-motor-driven oil pump in lieu of the engine-driven oil pump during "idling-stop" operation. According to this technique, during "idling-stop" operation, by virtue of hydraulic pressure of working oil discharged from the electric-motor-driven oil pump, the transmission can be kept in a state immediately before beginning of power transmission. Therefore, immediately when the engine is restarted by inhibiting "idling-stop" operation, it is possible to rapidly rise at least one hydraulic pressure, which pressure is used for shift control or speed-change control, up to a pressure value, above which the transmission can be kept in the power-transmission enabling state, with working oil discharged from the engine-driven oil pump. Thus, there is a less risk of undesirably inputting engine power, rising as a result of the "idling-stop" inhibition (the engine restart), to the transmission, which is not yet changed to the power-transmission enabling state. Thus, it is possible to remarkably reduce the delay of a transition of the transmission to its power-transmission enabling state, thereby effectively suppressing the durability of the transmission from being deteriorated.

However, even by the use of the electric-motor-driven oil pump as well as the engine-driven oil pump, it is difficult to certainly solve the previously-discussed problem of a deterioration of the durability of the transmission. This is because a remarkably-reduced but slight delay still exists between the engine restarting point and the point of time when a transition of the transmission to the power-transmission enabling state has been completed. To avoid this, that is to say, to certainly solve the deteriorated transmission durability occurring due to an undesirable input of engine power to the transmission not yet changed to its power-transmission enabling state, the following patent document 1 proposes and teaches an improved "idling-stop" cancellation control technique, namely, the use of a hydraulic pressure sensor. According to the technique disclosed in the patent document 1, whose controlled system is an automatic transmission rather than an engine, a pressure value of hydraulic pressure used for shift control is detected by means of the hydraulic pressure sensor after the engine restart based on "idling-stop" inhibition, and then the detected hydraulic pressure is compared to a predetermined pressure value, which is predetermined so as not to cause the previously-discussed problem. When the detected hydraulic pressure exceeds the predetermined pressure value, a start-up friction element (such as a forward clutch) of the transmission is changed from a state immediately before beginning of power transmission to a power-transmission enabling state.

Patent document 1: Japanese Patent Provisional Publication No. 2006-234013 (hereinafter is referred to as "JP2006-234013")

SUMMARY OF THE INVENTION

However, in the case of the control system disclosed in JP2006-234013, the start of idling-stop cancellation control, by which a vehicle driving system is changed to a state suited for vehicle-driving operation (that is, a vehicle-driving enabling state), is timed depending on whether the hydraulic pressure sensor signal value is greater than or equal to the predetermined pressure value. The use of the hydraulic pressure sensor leads to another problem as described hereunder.

For instance, in the presence of a hydraulic pressure sensor system failure, for example, short-circuiting or breaking of the hydraulic pressure sensor signal line, the actual hydraulic pressure used for shift control cannot be exactly detected by the hydraulic pressure sensor system. This means that the "idling-stop" cancellation control cannot be executed appropriately responsively to the actual hydraulic pressure used for shift control.

More concretely, in the presence of a short-circuited hydraulic pressure sensor system failure, generally, the detected value of the hydraulic pressure sensor tends to exhibit a maximum value. Thus, even when the actual hydraulic pressure used for shift control is not produced, the controller erroneously determines that the hydraulic pressure sensor signal value becomes greater than or equal to the predetermined pressure value. This leads to an erroneous execution of "idling-stop" cancellation control by which a transition of a vehicle driving system to a state suited for vehicle-driving operation occurs. Also, the fact that the actual hydraulic pressure used for shift control is not yet produced, means that the transmission is still kept in the power-transmission disabling state, nevertheless the "idling-stop" cancellation control is erroneously executed. Then, the vehicle driving system (containing the engine) is undesirably put into an engine power output state suited for vehicle-driving operation, thus exerting a bad influence on the durability of the transmission.

In contrast, in the presence of a broken hydraulic pressure sensor system failure, generally, the detected value of the hydraulic pressure sensor tends to exhibit a minimum value. Thus, even when the actual hydraulic pressure used for shift control has already been produced and develops adequately, the controller determines that the hydraulic pressure sensor signal value becomes less than the predetermined pressure value. This leads to an erroneous non-execution of "idling-stop" cancellation control. Also, the fact that the actual hydraulic pressure used for shift control has already been produced and develops adequately, means that the transmission is in the power-transmission enabling state, nevertheless the "idling-stop" cancellation control cannot be executed. Thus, the vehicle driving system (containing the engine) cannot be put into an engine power output state suited for vehicle-driving operation, thereby resulting in a lack of engine power output. This leads to the other problems, namely, the deteriorated vehicle driveability and/or impossible vehicle running.

The inventors of the present invention have discovered that an engine speed can be used for estimating a pressure value of hydraulic pressure used for shift control, since the engine speed and the pump pressure produced by an engine-driven oil pump correlate to each other. On the basis of the previously-discussed factual recognition that the engine speed can be used for hydraulic pressure estimation, it would be desirable to determine the timing of execution of "idling-stop" cancellation control based on the engine speed instead of directly using the detected value of pump pressure of working oil discharged from the engine-driven oil pump.

It is, therefore, in view of the previously-described disadvantages of the prior art, an object of the invention to provide an idling-stop cancellation control apparatus configured to enable idling-stop cancellation control of a vehicle driving system to be appropriately executed in accord with the aim responsively to an actual hydraulic pressure used for shift control without causing undesirable problems such as a deteriorated transmission durability, a deteriorated vehicle driveability and/or impossible vehicle running, even in the presence of a hydraulic pressure sensor system failure.

In order to accomplish the aforementioned and other objects of the present invention, an idling-stop cancellation control apparatus of a vehicle driving system of an automotive vehicle capable of running by a power produced by an engine and transmitted via a transmission whose shift is controlled by a hydraulic pressure produced by an engine-driven oil pump during operation of the engine, comprises an idling-stop control device configured to execute idling-stop operation by which the engine is automatically stopped when a first predetermined condition is satisfied under a state where a stop of the vehicle has been decided, and also configured to inhibit the idling-stop operation to restart the engine when the first predetermined condition becomes unsatisfied, the idling-stop control device comprising a first idling-stop cancellation control section configured to execute idling-stop cancellation control by which the vehicle driving system is put into a state suited for vehicle-driving operation when a second predetermined condition is satisfied, a decision on whether the second predetermined condition is satisfied being made based on at least a speed of the engine.

According to another aspect of the invention, a control method of a vehicle driving system of an idling-stop control device equipped automotive vehicle capable of running by a power produced by an engine and transmitted via a transmission whose shift is controlled by a hydraulic pressure produced by an engine-driven oil pump during operation of the engine, comprises detecting a hydraulic pressure used for shift control of the transmission, detecting a speed of the engine, executing idling-stop operation by which the engine is automatically stopped when a first predetermined condition is satisfied under a state where a stop of the vehicle has been decided, inhibiting the idling-stop operation to restart the engine when the first predetermined condition becomes unsatisfied, executing, based on the engine speed, idling-stop cancellation control by which the vehicle driving system is put into an output torque state suited for vehicle-driving operation, when a hydraulic pressure sensor system provided for detecting the hydraulic pressure is failed, and executing, based on the hydraulic pressure, idling-stop cancellation control by which the vehicle driving system is put into an output torque state suited for vehicle-driving operation, when the hydraulic pressure sensor system is unfailed.

The other objects and features of this invention will become understood from the following description with reference to the accompanying drawings.

BRIEF DESCRIPTION OF THE DRAWINGS

FIGS. 3A-3E are time charts explaining the idling-stop cancellation control routine of FIG. 2.

FIGS. 5A-5F are time charts explaining the idling-stop cancellation control routine of FIG. 4.

DESCRIPTION OF THE PREFERRED EMBODIMENTS

Figure 1:
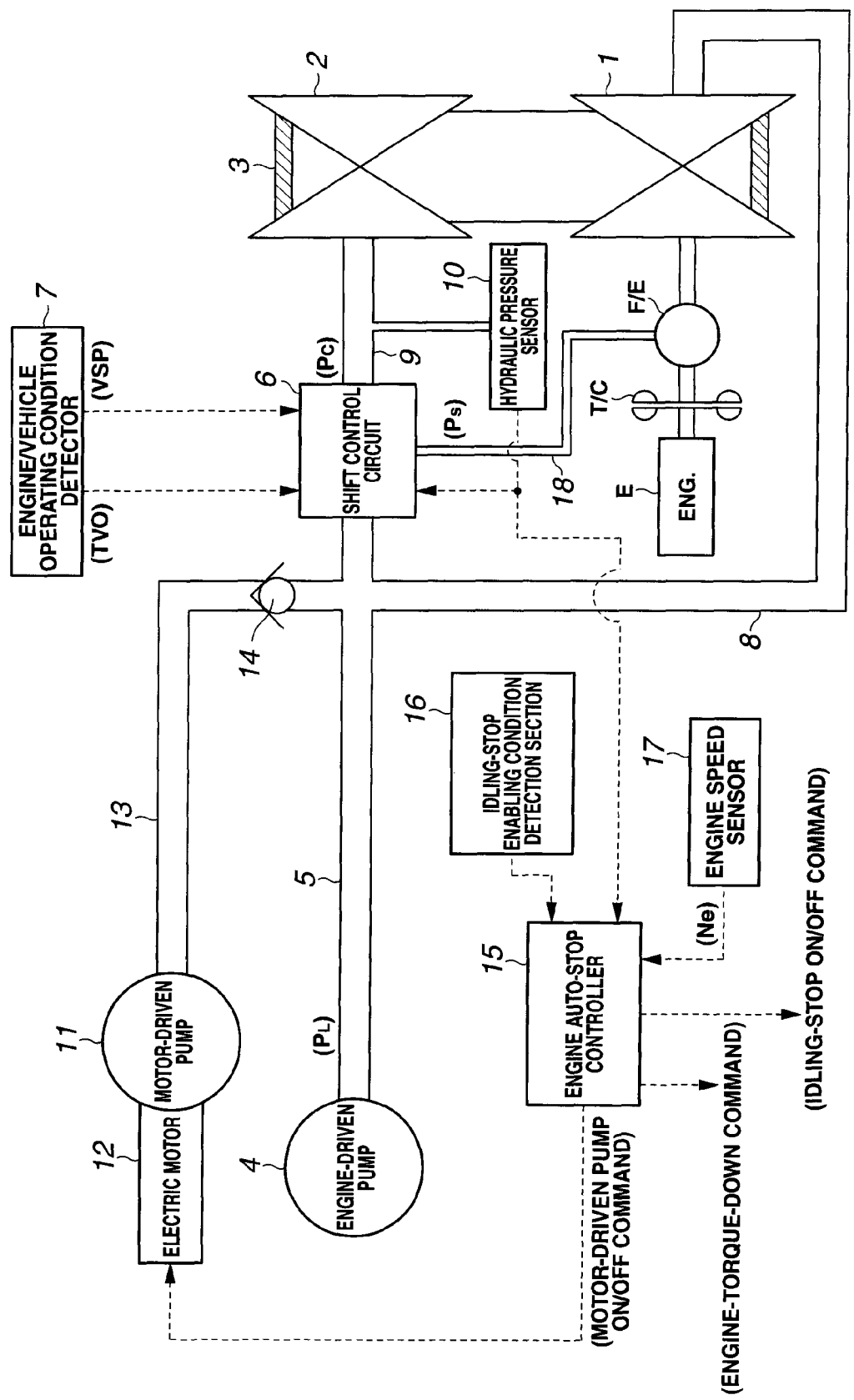
FIG. 1 is a system diagram illustrating an embodiment of an idling-stop cancellation control apparatus of a vehicle driving system of an idling-stop control device equipped automotive vehicle with a continuously variable automatic transmission.

Referring now to the drawings, particularly to FIG. 1, the idling-stop cancellation control apparatus of the vehicle driving system of the embodiment is exemplified in an idling-stop control device equipped automotive vehicle on which a continuously variable automatic transmission, often abbreviated to "CVT", is mounted. As a synonym (an equivalent) for the term "idling-stop", there is another term, for example, "start/stop", "start and stop", or "stop and start".

As seen from the system diagram of FIG. 1, in the shown embodiment, a belt-drive continuously variable transmission is used as the "CVT". The automotive vehicle is equipped with an internal combustion engine E mated to the CVT combined with a torque converter T/C. The belt-drive CVT has primary and secondary—driving and driven—pulleys 1 and 2 whose effective diameters are continuously changeable. Primary pulley 1 is often called an "input pulley", whereas secondary pulley 2 is often called an "output pulley". Primary pulley 1 and secondary pulley 2 are aligned with each other with respect to a plane perpendicular to the axes of these pulleys. The belt-drive CVT has a drive belt 3 (usually, a single segmented steel belt), running in primary and secondary variable-width pulleys 1-2 whose V grooves are aligned with each other, to provide varying transmission ratios (pulley ratios). Primary and secondary pulleys 1-2 and drive belt 3 construct a belt-driven power transmission mechanism.

The output shaft (i.e., an engine crankshaft) of engine E is connected to primary pulley 1 via a torque converter T/C and a start-up friction element F/E, and thus power output (output torque) of engine E is inputted via torque converter T/C and start-up friction element F/E to the input shaft of primary pulley 1. For instance, start-up friction element F/E is constructed by a friction element included in a forward and reverse (F/R) changeover mechanism (not shown), for example, a forward clutch or a reverse brake. Torque inputted to primary pulley 1 is transmitted to secondary pulley 2 by belt 3. Although it is not clearly shown in FIG. 1, secondary pulley 2 has a drive-connection with a differential via a final gear set to transmit driving torque via left and right axle driveshafts to respective drive road wheels for vehicle running. The detailed construction of the belt-drive CVT is hereunder described.

Secondary pulley 2 is comprised of an adjustable conical flange (a left-hand side movable sheave, viewing FIG. 1) and a stationary conical flange (a right-hand side stationary sheave) to form or define a V-shaped groove between the two opposing sheave surfaces. The left-hand side movable sheave of secondary pulley 2 is slidably connected onto the central shaft of the right-hand side stationary sheave by means of linear ball bearing splines (not shown for the purpose of illustrative simplification), in a manner so as to prevent relative rotation of the left-hand side movable sheave to the right-hand side stationary sheave and simultaneously to permit axial sliding movement of the left-hand side movable sheave relative to the right-hand side stationary sheave, to form a variable width pulley.

In a similar manner, primary pulley 1 is comprised of an adjustable conical flange (a right-hand side movable sheave, viewing FIG. 1) and a stationary conical flange (a left-hand side stationary sheave) to form or define a V-shaped groove between the two opposing sheave surfaces. The right-hand side movable sheave of primary pulley 1 is slidably connected onto the central shaft of the left-hand side stationary sheave by means of linear ball bearing splines (not shown), in a manner so as to prevent relative rotation of the right-hand side movable sheave to the left-hand side stationary sheave and simultaneously to permit axial sliding movement of the right-hand side movable sheave relative to the left-hand side stationary sheave, to form a variable width pulley. The effective diameters of primary and secondary pulleys 1-2 are continuously changeable by moving the left-hand side movable sheave of secondary pulley 2 toward the right-hand side stationary sheave of secondary pulley 2 in such a manner as to decrease the V-groove width of secondary pulley 2 and simultaneously moving the right-hand side movable sheave of primary pulley 1 apart from the left-hand side stationary sheave of primary pulley 1 in such a manner as to increase the V-groove width of primary pulley 1 or by moving the left-hand side movable sheave of secondary pulley 2 apart from the right-hand side stationary sheave of secondary pulley 2 in such a manner as to increase the V-groove width of secondary pulley 2 and simultaneously moving the right-hand side movable sheave of primary pulley 1 toward the left-hand side stationary sheave of primary pulley 1 in such a manner as to decrease the V-groove width of primary pulley 1. That is, the actual transmission ratio of the CVT can be steplessly adjusted by changing a radius of a contact circle of belt 3 of the driving pulley side (i.e., primary pulley 1) and a radius of a contact circle of belt 3 of the driven pulley side (i.e., secondary pulley 2).

Automatic shift control (or automatic ratio-changing) of the belt-drive CVT is performed by adjusting a secondary pulley thrust, created by at least a pulley pressure applied to the left-hand side movable sheave of secondary pulley 2. Basically, as a working medium for shift control, working oil is supplied from an engine-driven oil pump 4, which is driven by engine E connected via torque converter T/C and friction element F/E to the input shaft of primary pulley 1, to a line pressure supply line 5. To achieve the shift control (described hereunder), a shift control circuit 6, which is comprised of an electronic controller and a hydraulic controller (or a hydraulic modulator), is provided. In the shown embodiment, the engine-driven oil pump 4 is constructed by a non-reversible pump such as a rotary vane pump, which is configured to prevent working oil in line pressure supply line 5 from being flown back to an oil pan (not shown) in a stopped state of engine E.

The electronic controller of shift control circuit 6 generally comprises a microcomputer. The controller includes an input/output interface (I/O), memories (RAM, ROM), and a microprocessor or a central processing unit (CPU). The input/output interface (I/O) of the controller receives input information from an engine/vehicle operating condition detector (engine/vehicle operating condition detection means) 7, that is, various engine/vehicle sensors, concretely, at least a throttle opening sensor and a vehicle speed sensor. The throttle opening sensor is provided to detect a throttle-valve opening (simply, a throttle opening) TVO. The vehicle speed sensor is provided to detect a vehicle speed VSP. Within the controller of shift control circuit 6, the central processing unit (CPU) allows the access by the I/O interface of input informational data signals (TVO, VSP) from the previously-discussed engine/vehicle sensors. A pressure regulator valve (not shown), which is included in the hydraulic modulator of shift control circuit 6, is configured to regulate, based on the input information (TVO, VSP), the hydraulic pressure of working oil, supplied from engine-driven oil pump 4 to line pressure supply line 5, to a line pressure $P_L$ suited for a transmission input torque inputted to the input shaft of the CVT. The regulated line pressure $P_L$ is used as a hydraulic pressure used for shift control, that is, a primary pulley pressure. The regulated line pressure $P_L$ is applied to the right-hand side movable sheave surface of primary pulley 1 via a primary pulley-pressure line 8, such that the right-hand side movable sheave surface of primary pulley 1 is forced toward the left-hand side stationary sheave surface by a primary pulley thrust corresponding to or suited for the transmission input torque and created by the regulated line pressure $P_L$ (i.e., the primary pulley pressure). Thus, belt 3 is kept in friction-contact with the V groove of the two opposing sheave surfaces of primary pulley 1, by the primary pulley thrust corresponding to the transmission input torque.

Shift control circuit 6 is further configured to calculate, based on latest up-to-date input information about the engine-and-vehicle operating condition, namely, throttle opening TVO and vehicle speed VSP, a desired input rotational speed (in other words, a desired transmission ratio) suited for the current engine-and-vehicle operating condition, from a pre-programmed shift map.

Shift control circuit 6 is further configured to create a shift-control pressure Pc that achieves the desired input rotational speed (i.e., the desired transmission ratio), while using the regulated line pressure $P_L$ in line pressure supply line 5 as an original hydraulic pressure. Shift-control pressure Pc, originated from the regulated line pressure $P_L$, is applied to the left-hand side movable sheave surface of secondary pulley 2 via a shift-control pressure line 9, such that the left-hand side movable sheave surface of secondary pulley 2 is forced toward the right-hand side stationary sheave surface by a secondary pulley thrust created by a spring bias (a preload) of a preloading spring (not shown) as well as shift-control pressure Pc. Thus, belt 3 is kept in friction-contact with the V groove of the two opposing sheave surfaces of secondary pulley 2, by the secondary pulley thrust (that is, the spring bias plus shift-control pressure Pc).

As set forth above, the adjustable flange of primary pulley 1 is forced toward the associated stationary flange by the primary pulley thrust created by the regulated line pressure $P_L$ (the primary pulley pressure), and at the same time the adjustable flange of secondary pulley 2 is forced toward the associated stationary flange by the secondary pulley thrust created by the spring bias plus shift-control pressure Pc, thereby enabling power transmission between primary and secondary pulleys 1-2 via belt 3, while keeping belt 3 in friction-contact with the v grooves of primary and secondary pulleys 1-2. In this manner, automatic shift control is achieved such that the actual input rotational speed (in other words, the actual transmission ratio) of the CVT is brought closer to the desired input rotational speed (in other words, the desired transmission ratio). In the same manner as the regulated line pressure $P_L$, which is used as a hydraulic pressure used for shift control, i.e., the primary pulley pressure, shift-control pressure Pc is also used as a hydraulic pressure used for shift control, that is, a secondary pulley pressure. Actually, the primary pulley pressure (i.e., the regulated line pressure $P_L$) is supplied to a primary pulley actuation cylinder or a primary pulley actuation chamber associated with the primary-pulley movable sheave, while the secondary pulley pressure (i.e., the shift-control pressure Pc) is supplied to a secondary pulley actuation cylinder or a secondary pulley actuation chamber associated with the secondary-pulley adjustable sheave.

Generally, shift-control pressure Pc tends to be affected by an undesired disturbance and thus a deviation of shift-control pressure Pc from the desired pressure value that achieves the desired input rotational speed (i.e., the desired transmission ratio) often occurs. That is, there is a risk that such a disturbance exerts a bad influence on high-precision shift control. To avoid this, the following feedback (F/B) control system is also provided.

One of major components employed with the previously-noted F/B control system, is a hydraulic pressure sensor 10 attached to secondary pulley-pressure line 9, for detecting a hydraulic pressure (i.e., shift-control pressure Pc) in the secondary pulley actuation cylinder associated with the secondary-pulley adjustable sheave. The hydraulic pressure, which is actually applied to the secondary-pulley adjustable sheave and detected by hydraulic pressure sensor 10, is fed back to shift control circuit 6.

The processor of the electronic controller of shift control circuit 6 calculates a deviation of the fed-back hydraulic pressure, based on the sensor signal from hydraulic pressure sensor 10, from a command value of shift-control pressure Pc, needed to achieve the desired input rotational speed (the desired transmission ratio). Then, shift control circuit 6 changes the command value of shift-control pressure Pc in such a manner as to reduce the calculated deviation to zero. By the previously-discussed F/B control, there is a less deviation of shift-control pressure Pc from a desired hydraulic pressure needed to achieve the desired input rotational speed (the desired transmission ratio), even in the presence of an undesired disturbance, thus enabling continuous fulfillment of high-precision shift control.

Shift control circuit 6 is still further configured to create a start-up friction element engagement pressure Ps that is delivered via a start-up friction element engagement pressure line 18 to friction element F/E for engagement of friction element F/E, while using the regulated line pressure $P_L$ in line pressure supply line 5 as an original hydraulic pressure. In the system of the embodiment, when engaging friction element F/E, start-up friction element engagement pressure Ps is controlled to a pressure value that friction element F/E is engaged with a torque capacity enough to transmit an input torque inputted to the input shaft of primary pulley 1 of the CVT.

In the shown embodiment, as discussed previously, engine E, mated to the input shaft of primary pulley 1 of the CVT, employs the idling-stop control device for the purpose of improved fuel economy. The idling-stop control device is configured to execute engine auto-stop operation (often called "idling-stop" operation), when a predetermined condition (exactly, a first predetermined condition) is satisfied under a state where a stop of the vehicle has been decided (hereinafter referred to as "vehicle-stop decision state"). In the system of the embodiment, the controller determines that the vehicle is in the "vehicle-stop decision state", when vehicle speed VSP is less than a predetermined very low vehicle speed value (a criterion speed value) needed to decide on a stop of the vehicle. For instance, when the "vehicle-stop decision state" in which the driver has no intention of starting the vehicle, continues for a preset time duration, the controller determines that the aforesaid predetermined condition is satisfied.

As discussed above, in the shown embodiment, the "vehicle-stop decision state" that vehicle speed VSP is less than the predetermined very low vehicle speed value (the criterion speed value for vehicle-stop decision), is used as an idling-stop condition. Hence, as a matter of course, the idling-stop operation is executed in the vehicle stopped state (or during vehicle standstill). Additionally, the idling-stop operation can be executed from the time when the vehicle is still running at very low vehicle speeds just before the vehicle completely stops.

The idling-stop operation is inhibited to automatically restart the engine, in the presence of the driver's operation corresponding to the driver's intention of starting the vehicle, for instance when the brakes are released and thus the brake system is changed from operative to inoperative.

By the way, during idling-stop operation, engine E is kept inoperative and thus there is no working oil discharged from engine-driven oil pump 4. Thus, there is line pressure $P_L$ cannot be produced, and also shift-control pressure Pc and start-up friction element engagement pressure Ps cannot be created by shift control circuit 6.

Hence, belt 3 cannot be kept in friction-contact with the V grooves of primary and secondary pulleys 1-2, and also start-up friction element F/E cannot be engaged. As a result, the belt-drive CVT becomes kept in a power-transmission disabling state.

When engine E is restarted by inhibiting the idling-stop operation under the power-transmission disabling state, working oil is discharged from engine-driven oil pump 4 and then line pressure $P_L$ is produced. Hence, shift control circuit 6 can create shift-control pressure Pc and start-up friction element engagement pressure Ps, both originated from line pressure $P_L$. As a result, a transition of the belt-drive CVT from the power-transmission disabling state to the power-transmission enabling state occurs.

As may be appreciated, there is a response delay between the restarting point of engine E and the time when a transition of the belt-drive CVT from the power-transmission disabling state to the power-transmission enabling state, accomplished by the created shift-control pressure Pc and start-up friction element engagement pressure Ps, has been completed.

Assume that, after the engine restart triggered by idling-stop inhibition, idling-stop cancellation control is executed to change the vehicle driving system (containing the engine) to a state suited for vehicle-driving operation during a time period corresponding to the above-mentioned response delay. In such a case, engine output torque, rising as a result of the idling-stop cancellation, would be undesirably inputted to the belt-drive CVT, not yet changed to the power-transmission enabling state but still remaining kept in the power-transmission disabling state, thereby deteriorating the durability of the CVT.

To reduce such an undesirable response delay, the system of the embodiment is configured to operate an electric-motor-driven oil pump 11 in lieu of engine-driven oil pump 4 during idling-stop operation. That is to say, during idling-stop operation, by virtue of hydraulic pressure of working oil discharged from electric-motor-driven oil pump 11, the belt-drive CVT can be kept in a state immediately before beginning of power transmission.

Electric-motor-driven oil pump 11 is driven by means of an electric motor 12 for exclusive use. The exclusive-use motor 12 is constructed as a small-size motor capable of outputting a minimum motor output needed to drive electric-motor-driven oil pump 11. The discharge port of electric-motor-driven oil pump 11 is connected via an electric-motor-driven oil pump pressure line 13 to line pressure supply line 5. As seen in FIG. 1, a one-way check valve 14 is disposed in electric-motor-driven oil pump pressure line 13, to prevent undesirable working-oil flow from line pressure supply line 5 toward the discharge port of electric-motor-driven oil pump 11. In more detail, check valve 14 is provided for preventing an undesired situation that line pressure $P_L$ cannot be satisfactorily produced due to an undesirable leakage of working oil discharged from engine-driven oil pump 4 via electric-motor-driven oil pump 11 into the oil pan during operation of engine-driven oil pump 4.

With the previously-discussed arrangement, during idling-stop operation, working oil discharged from electric-motor-driven oil pump 11 functions as a working medium, and thus shift control circuit 6 can create hydraulic pressures (described later), enough to bring the CVT to a state immediately before beginning of power transmission, within the major shift-control oil passages (i.e., line pressure supply line 5, shift-control pressure line 9, and start-up friction element engagement pressure line 18).

That is, during idling-stop operation, shift control circuit 6 can maintain the hydraulic pressure in line pressure supply line 5 and the hydraulic pressure in shift-control pressure line 9 at respective hydraulic pressures under which belt 3 is kept at a state immediately before a degree of friction-contact of belt 3 with the V grooves of primary and secondary pulleys 1-2 starts to develop and there is a less clearance space between both sidewalls of belt 3 and the two opposing sheave surfaces of each of primary and secondary pulleys 1-2. Additionally, during idling-stop operation, shift control circuit 6 can also maintain the hydraulic pressure in start-up friction element engagement pressure line 18 at a hydraulic pressure under which start-up friction element F/E is kept at a state immediately before an engagement capacity (an engagement degree) of friction element F/E (e.g., a forward clutch included in the F/R changeover mechanism or a reverse brake included in the F/R changeover mechanism) starts to develop against the spring force of a return spring built in friction element F/E.

As set forth above, by operating electric-motor-driven oil pump 11 instead of engine-driven oil pump 4 during idling-stop operation, it is possible to keep the CVT in a state immediately before beginning of power transmission.

Therefore, immediately when engine E is restarted by idling-stop inhibition, shift control circuit 6 can rapidly rise each of hydraulic pressures, which pressures are used for shift control, from a first pressure value of hydraulic pressure originated from hydraulic pressure of working oil discharged from electric-motor-driven oil pump 11 and regulated to keep the CVT in a state immediately before beginning of power transmission to a second pressure value of hydraulic pressure originated from hydraulic pressure of working oil discharged from engine-driven oil pump 4 and regulated to bring the CVT to the power-transmission enabling state. Thus, power can be certainly transmitted through the CVT without any drive-belt slippage from the point in time of the restart of engine E. This contributes the enhanced ability to restart the vehicle, and also effectively suppresses a deterioration of the durability of the belt-drive CVT, occurring during a transition of the CVT from the power-transmission disabling state to the power-transmission enabling state.

However, even by the addition of electric-motor-driven oil pump 11, it is difficult to certainly solve the previously-discussed problem of a deterioration of the durability of the CVT. To avoid this, that is to say, to certainly solve the deteriorated transmission durability occurring due to an undesirable input of engine power to the CVT not yet changed to its power-transmission enabling state, the system of the embodiment is further equipped with an engine auto-stop controller 15 (see FIG. 1).

The above-mentioned idling-stop operation of engine E and the operation of motor 12 of electronic-motor-driven oil pump 11 are controlled by engine auto-stop controller 15. Concretely, engine auto-stop controller 15 is configured to generate an idling-stop ON/OFF command (an idling-stop enabling/disabling command signal) for permitting or inhibiting idling-stop operation. Engine auto-stop controller 15 is further configured to generate an electronic-motor-driven oil pump ON/OFF command (an electronic-motor-driven oil pump activation/deactivation command signal) for activating or deactivating motor 12 of electric-motor-driven oil pump 11. Engine auto-stop controller 15 is still further configured to execute the idling-stop cancellation control routine shown in FIG. 2, for the purpose of idling-stop cancellation control for the vehicle driving system, as described later in reference to the time charts of FIGS. 3A-3E. Notice that the term "idling-stop inhibition" differs from the term "idling-stop cancellation control". As described later in reference to the time charts of FIGS. 3A-3E, the term "idling-stop inhibition" means an output of an idling-stop OFF command for inhibiting idling-stop operation. On the other hand, the term "idling-stop cancellation control" means a transition of the vehicle driving system (containing the engine) from an engine torque-down state (described later) to an engine output torque state suited for vehicle-driving operation.

As seen from the system diagram of FIG. 1, the input/output interface (I/O) of engine auto-stop controller 15 receives input information from an idling-stop enabling condition detection section 16, an engine speed sensor 17, and hydraulic pressure sensor 10.

Engine speed sensor 17 is provided to detect engine speed Ne. Idling-stop enabling condition detection section 16 is provided to detect an idling-stop enabling condition. Concretely, the idling-stop enabling condition includes a ratio of the rotational speed of primary pulley 1 to the rotational speed of secondary pulley 2 (that is, a transmission ratio or a pulley ratio of the belt-drive CVT), a transmission working-oil temperature, an operative state of the brake system, vehicle speed VSP, an accelerator opening APO detected by an accelerator opening sensor (an accelerator position sensor), and a gradient (a slope) of a road surface on which the vehicle is stopping.

In order to satisfy the above-mentioned idling-stop enabling condition, the pulley ratio of the CVT must be within a predetermined pulley-ratio range substantially corresponding to the lowest transmission ratio, the transmission working-oil temperature must be within a temperature range substantially corresponding to transmission working-oil temperatures after engine warm-up has been completed, the brake system must be in the operative state, vehicle speed VSP must be less than the predetermined very low vehicle speed value (the criterion speed value for vehicle-stop decision), accelerator opening APO must be within a predetermined accelerator opening range substantially corresponding to a zero accelerator opening, and the gradient of the road surface on which the vehicle is stopping must be within a road-surface gradient range substantially corresponding to a zero road-surface gradient (i.e., a flat road).

The details of the idling-stop control (the idling-stop ON/OFF command) and the electronic-motor-driven oil pump control (the electronic-motor-driven oil pump ON/OFF command), both executed within engine auto-stop controller 15, are hereunder described.

First, engine auto-stop controller 15 determines, based on latest up-to-date input information (i.e., the current pulley ratio, the current transmission working-oil temperature, the operative state of the brake system, the current value of vehicle speed VSP, the current value of accelerator opening APO, and the current road-surface gradient) from idling-stop enabling condition detection section 16, whether idling-stop control should be executed (enabled) or inhibited (disabled).

When the decision result on the idling-stop control enabling condition is negative, that is, when idling-stop control should be inhibited (disabled), engine auto-stop controller 15 outputs an idling-stop OFF command to the engine side, and simultaneously outputs an electronic-motor-driven oil pump OFF command to electronic-motor-driven oil pump 11 (exactly, to motor 12), for inhibiting idling-stop operation and for permitting engine E to run continuously. Thus, by virtue of working oil discharged from engine-driven oil pump 4, the belt-drive CVT can perform automatic shift control (automatic ratio-changing) usually.

Conversely when the decision result on the idling-stop control enabling condition is affirmative, that is, when idling-stop control should be executed (enabled), engine auto-stop controller 15, first, outputs an electronic-motor-driven oil pump ON command to electronic-motor-driven oil pump 11 (exactly, to motor 12), before determining which of an idling-stop ON command and an idling-stop OFF command should be outputted. Thereafter, engine auto-stop controller 15 determines, based on up-to-date input information from hydraulic pressure sensor 10, whether electric-motor-driven oil pump 11 is actually driven responsively to the electronic-motor-driven oil pump ON command. When the sensor signal value of hydraulic pressure sensor 10 indicates a pressure level equivalent to hydraulic pressure produced by electric-motor-driven oil pump 11 actually driven, controller 15 determines that the electric power system and the motor control system both associated with electric-motor-driven oil pump 11 (the exclusive-use motor 12) are normally operating, and a pump failure of electric-motor-driven oil pump 11, which may occur due to dusts and debris jammed among moving parts constructing pump 11 does not occur.

When controller 15 determines that electric-motor-driven oil pump 11 is unfailed and normally operating, controller 15 outputs an idling-stop ON command to the engine side, for automatically stopping engine E.

At this time, electric-motor-driven oil pump 11 is operating continuously by the electric-motor-driven ON command already outputted from controller 15 to electric-motor-driven pump 11 (exactly, motor 12). In this manner, during idling-stop operation, by virtue of working oil discharged from electric-motor-driven oil pump 11, the belt-drive CVT can be kept in a state immediately before beginning of power transmission.

Therefore, immediately when engine E is restarted by idling-stop inhibition (by outputting the idling-stop OFF command), it is possible to more certainly rapidly change the belt-drive CVT to its power-transmission enabling state.

In contrast, when controller 15 determines that electric-motor-driven oil pump 11 (motor 12) is failed or when controller 12 determines that electric-motor-driven oil pump 11 (motor 12) is normally operating but the decision result on the idling-stop control enabling condition is negative (i.e., idling-stop control should be inhibited), controller 15 outputs an idling-stop OFF command to the engine side for inhibiting idling-stop operation, and simultaneously outputs an electronic-motor-driven oil pump OFF command to electronic-motor-driven oil pump 11 (exactly, to motor 12) for stopping the operation of electronic-motor-driven oil pump 11.

Therefore, there is no risk that idling-stop operation is erroneously forcibly executed in spite of a failure in electronic-motor-driven oil pump 11, thereby avoiding the durability of the belt-drive CVT from being deteriorated due to an undesirable input of engine power to the belt-drive CVT, not yet changed to the power-transmission enabling state but remaining kept in the power-transmission disabling state, when the engine is restarted by idling-stop inhibition after such an erroneous or forcible execution of idling-stop operation.

Additionally, when the decision result on the idling-stop control enabling condition is negative, that is, when idling-stop control should be inhibited (disabled), in accordance with this idling-stop inhibiting (disabling) requirement, it is possible to certainly inhibit idling-stop operation from being executed.

As discussed above, during idling-stop operation, the belt-drive CVT can be kept in a state immediately before beginning of power transmission by virtue of working oil discharged from electric-motor-driven oil pump 11, and thus there is a less risk that the durability of the belt-drive CVT is affected by an undesirable input of engine power to the CVT, not yet changed to the power-transmission enabling state, just after engine-restart operation triggered by idling-stop inhibition. However, such a function that prevents an undesirable input of engine power to the CVT, not yet changed to the power-transmission enabling state, just after engine-restart operation is still insufficient. In order to assist or enhance the above function, and to more certainly prevent an undesirable input of engine power to the CVT, not yet changed to the power-transmission enabling state, just after engine-restart operation, as hereunder described in detail, engine auto-stop controller 15, incorporated in the system of the embodiment, is configured to execute the following idling-stop cancellation control routine shown in FIG. 2, for the purpose of idling-stop cancellation control for the vehicle driving system (described later in reference to the time charts of FIGS. 3A-3E).

Figure 2:
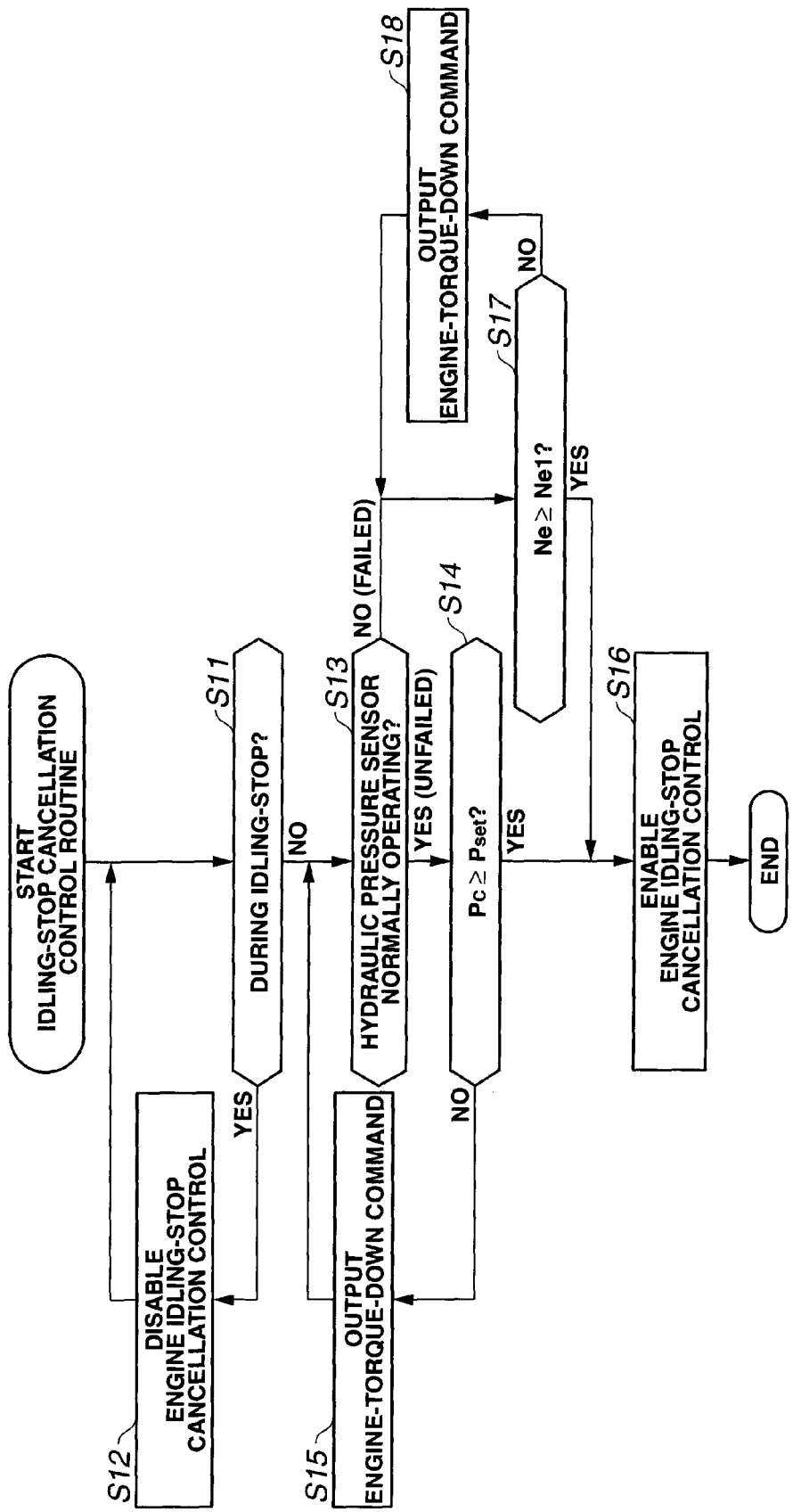
FIG. 2 is a flowchart illustrating an idling-stop cancellation control routine executed within an engine auto-stop controller incorporated in the idling-stop cancellation control apparatus of the first embodiment.

Referring now to FIG. 2, there is shown the idling-stop cancellation control routine executed within engine auto-stop controller 15 incorporated in the idling-stop cancellation control apparatus of the first embodiment. The routine shown in FIG. 2 is executed as time-triggered interrupt routines to be triggered every predetermined time intervals.

At step S11, a check is made to determine whether engine E is in its idling-stop state. When the answer to step S1 is in the affirmative (YES), that is, during idling-stop operation of engine E, the routine proceeds from step S11 to step S12. Conversely when the answer to step S11 is in the negative (NO), that is, when engine E is out of the idling-stop state, the routine proceeds from step S11 to step S13.

At step S12, controller 15 inhibits idling-stop cancellation control by which the vehicle driving system (containing engine E) is put into an engine power output state suited for vehicle-driving operation (simply, a vehicle-driving enabling state).

At step S13, a check is made to determine whether hydraulic pressure sensor 10 is normally operating. The hydraulic pressure sensor 10 is provided for monitoring or determining whether each of hydraulic pressures in the major shift-control oil passages (i.e., line pressure supply line 5, shift-control pressure line 9, and start-up friction element engagement pressure line 18) indicate a pressure level equivalent to hydraulic pressure produced by means of engine-driven oil pump 4 or electric-motor-driven oil pump 11 (in other words, a pressure level equivalent to a revolution speed of engine-driven oil pump 4 or a motor-shaft revolution speed of motor 12 of electric-motor-driven oil pump 11). In the shown embodiment, hydraulic pressure sensor 10 is screwed into shift-control pressure line 9 in a manner so as to detect shift-control pressure Pc as a hydraulic pressure used for shift control. In lieu thereof, a hydraulic pressure sensor may be attached to line pressure supply line 5 in a manner so as to detect line pressure $P_L$ as a hydraulic pressure used for shift control.

Concretely, when the hydraulic pressure value detected by hydraulic pressure sensor 10 is within a predetermined pressure range substantially corresponding to the current revolution speed of engine-driven oil pump 4 or the current motor-shaft revolution speed of motor 12 of electric-motor-driven oil pump 11, controller 15 determines that hydraulic pressure sensor 10 is normally operating. Conversely when the hydraulic pressure value detected by hydraulic pressure sensor 10 is out of the predetermined pressure range substantially corresponding to the current revolution speed of engine-driven oil pump 4 or the current motor-shaft revolution speed of motor 12 of electric-motor-driven oil pump 11, controller 15 determines that hydraulic pressure sensor 10 is abnormally operating and thus a failure in the hydraulic pressure sensor system occurs. As discussed above, step S13 constructs or functions as hydraulic pressure sensor system failure detection means (a hydraulic pressure sensor system failure detector).

When the answer to step S13 is affirmative (YES), that is, when controller 15 determines that hydraulic pressure sensor 10 is normally operating, the routine proceeds from step S13 to step S14.

At step S14, a check is made to determine whether the hydraulic pressure value detected by hydraulic pressure sensor 10, that is, the hydraulic pressure used for shift control (i.e., shift-control pressure Pc) is greater than or equal to a predetermined hydraulic pressure value Pset. The predetermined hydraulic pressure value Pset is preset to a lower limit of the hydraulic pressure used for shift control (a lower limit of shift-control pressure Pc in the shown embodiment) above which there is a less tendency for the durability of the transmission to be harmfully affected by an undesirable input of engine power (engine output torque) to the transmission.

When the answer to step S14 is negative (NO), that is, when Pc<Pset, the routine returns to step S13 via step S15. That is, the return flow from step S14 via step S15 to step S13 is repeatedly executed until the hydraulic pressure value detected by hydraulic pressure sensor 10, that is, the hydraulic pressure used for shift control (i.e., shift-control pressure Pc) reaches predetermined hydraulic pressure value Pset.

At step S15, controller 15 generates an engine-torque-down command to the engine side so as to suppress or avoid engine power (engine output torque) from exerting a bad influence on the durability of the transmission even under a low hydraulic pressure used for shift control, that is, even under low shift-control pressure Pc (<Pset) (see an engine-torque-down command generated from engine auto-stop controller 15 in the system diagram of FIG. 1).

As soon as the answer to step S14 becomes affirmative (YES), that is, when the hydraulic pressure value detected by hydraulic pressure sensor 10, that is, the hydraulic pressure used for shift control (i.e., shift-control pressure Pc) becomes greater than or equal to predetermined hydraulic pressure value Pset, the routine proceeds from step S14 to step S16.

At step S16, controller 15 permits idling-stop cancellation control for engine E. Immediately when idling-stop cancellation control is permitted, an output of the previously-noted engine-torque-down command is inhibited, and thus engine power (engine output torque) gradually develops and rises up to an engine output torque value suited for vehicle-driving operation, while effectively suppressing power-train shocks which may occur due to a rapid engine torque change.

Returning to step S13, when the answer to step S13 is negative (NO), that is, when controller 15 determines that hydraulic pressure sensor 10 is abnormally operating and thus a failure in the hydraulic pressure sensor system occurs, the routine proceeds from step S13 to step S17.

At step S17, a check is made to determine whether engine speed Ne is greater than or equal to a first predetermined engine speed Ne1 (i.e., a first engine-speed threshold value).

In order to more certainly achieve the later-mentioned operation and effects, first predetermined engine speed Ne1 is preset to an engine speed suited for a moderate vehicle-starting period required hydraulic pressure, which pressure is needed to produce a hydraulic pressure (shift-control pressure Pc) used for shift control and required for moderately starting the vehicle. The engine speed suited for moderate vehicle-starting period required hydraulic pressure, needed to produce a hydraulic pressure (shift-control pressure Pc) used for shift control and required for moderately starting the vehicle, is hereinafter referred to as "moderate vehicle-starting period required-hydraulic-pressure producing engine speed". Therefore, the inequality defined by Ne>Ne1 means that the hydraulic pressure used for shift control (i.e., shift-control pressure Pc) develops sufficiently such that there is a less tendency for the durability of the transmission to be harmfully affected by an undesirable input of engine power (engine output torque) to the transmission. That is to say, a check (executed at step S17) on whether engine speed Ne is greater than or equal to first predetermined engine speed Ne1 (i.e., "moderate vehicle-starting period required-hydraulic-pressure producing engine speed") is equivalent to a check (executed at step S14) on whether the hydraulic pressure value detected by hydraulic pressure sensor 10, that is, the hydraulic pressure used for shift control (i.e., shift-control pressure Pc) is greater than or equal to predetermined hydraulic pressure value Pset.

When the answer to step S17 is negative (NO), that is, when Ne<Ne1, the routine proceeds from step S17 to step S18, and returns again to step S17. That is, the return flow to step S17 via step S18 is repeatedly executed, until engine speed Ne reaches first predetermined engine speed Ne1.

At step S18 of FIG. 2, in a similar manner to step S15 of FIG. 2, controller 15 generates an engine-torque-down command to the engine side so as to suppress or avoid engine power (engine output torque) from exerting a bad influence on the durability of the transmission even under a low engine speed Ne (<Ne1), in other words, even under a low hydraulic pressure used for shift control, that is, even under low shift-control pressure Pc (<Pset) produced with engine E running at low engine speeds (see an engine-torque-down command generated from engine auto-stop controller 15 in FIG. 1).

After step S18 of FIG. 2, the routine returns to step S17. The above-mentioned engine torque-down control is continuously executed, until step S17 determines that the condition defined by the inequality Ne≧Ne1 becomes satisfied.

As soon as the answer to step S17 becomes affirmative (YES), that is, when engine speed Ne becomes greater than or equal to first predetermined engine speed Ne1, the routine proceeds from step S17 to step S16. Through step S16, controller 15 terminates the previously-noted engine-torque-down control and permits engine-idling-stop cancellation control, such that engine power (engine output torque) gradually develops and rises up to an engine output torque value suited for vehicle-driving operation (for usual vehicle running). Therefore, step S17, together with step S16, constructs or functions as first idling-stop cancellation control means (or a first idling-stop cancellation control section incorporated in the control system of the first embodiment and configured to execute, based on engine speed Ne, idling-stop cancellation control) by which it is possible to more certainly prevent an undesirable input of engine power to the CVT, not yet changed to the power-transmission enabling state, just after engine-restart operation, even in the presence of a failure in the hydraulic pressure sensor system. On the other hand, step S14, together with step S16, constructs or functions as second idling-stop cancellation control means (or a second idling-stop cancellation control section incorporated in the control system of the first embodiment and configured to execute, based on the detected value of hydraulic pressure sensor 10, idling-stop cancellation control) by which it is possible to more certainly prevent an undesirable input of engine power to the CVT, not yet changed to the power-transmission enabling state, just after engine-restart operation, in the absence of a failure in the hydraulic pressure sensor system.

As discussed above, first predetermined engine speed Ne1 (used in the comparative step S17 of FIG. 2) is preset to the "moderate vehicle-starting period required-hydraulic-pressure producing engine speed", suited to produce a hydraulic pressure (shift-control pressure Pc) used for shift control and required for moderate vehicle-starting, by engine-driven oil pump 4. It will be appreciated that setting of first predetermined engine speed Ne1 is not limited to such a "moderate vehicle-starting period required-hydraulic-pressure producing engine speed". For instance, a minimum engine speed (for instance, an idle speed), which is needed to produce a minimum hydraulic pressure used for shift control (a minimum shift-control pressure Pc) by means of engine-driven oil pump 4, is utilized as a reference speed value. For the purpose of enhancing the accuracy of the decision on whether the hydraulic pressure used for shift control (i.e., shift-control pressure Pc) develops sufficiently such that there is a less tendency for the durability of the transmission to be harmfully affected by an undesirable input of engine power (engine output torque) to the transmission, a safety margin is added to the minimum engine speed (e.g., an idle speed). It is preferable to preset first predetermined engine speed Ne1 as the summed value of the minimum engine speed (e.g., an idle speed) and the safety margin. The use of the summed value of the minimum engine speed (e.g., an idle speed) and the safety margin as first predetermined engine speed Ne1, contributes to the high-precision decision.

Referring now to FIGS. 3A-3E, there are shown the time charts related to the idling-stop cancellation control routine of FIG. 2.

The time charts of FIGS. 3A-3E show the simulation results, obtained by the control system of the idling-stop cancellation control apparatus of the first embodiment, under the following test condition. That is, engine E is restarted in response to an idling-stop OFF command at the time t1 (see FIG. 3A), and thus engine speed Ne begins to rise from the time t1 with a change in time series as shown in FIG. 3B. With the engine speed rise with the time-series change, shift control pressure Pc, which is originated from hydraulic pressure of working oil discharged from engine-driven oil pump 4, also begins to rise just after the time t1 (see the shift-control-pressure rise indicated by the two-dotted line in FIG. 3C. Thereafter, assume that shift control pressure Pc continues to rise after the time t2, but breaking of the hydraulic pressure sensor signal line of hydraulic pressure sensor 10, which is provided for detecting shift control pressure Pc, occurs at the time t2, and thus the detected value of hydraulic pressure sensor 10 exhibits a minimum value from the time t2.

Hitherto, execution of idling-stop cancellation control was based on only the detected value of a hydraulic pressure sensor, in such a manner as to permit the idling-stop cancellation control to be initiated only when the hydraulic pressure sensor signal value exceeds a predetermined pressure value. In such a case, after a broken hydraulic pressure sensor system failure has occurred at the time t2 and thus the hydraulic pressure sensor signal value has become minimum, it is impossible to reexecute idling-stop cancellation control. The fact that the hydraulic-pressure-sensor signal value has become minimum but the actual shift control pressure Pc develops adequately with a continuous pressure rise in the actual hydraulic pressure used for shift control (see the pressure rise characteristic indicated by the two dotted line in FIG. 3C), means that the transmission is in the power-transmission enabling state, nevertheless the idling-stop cancellation control cannot be reexecuted. Thus, after the time t2, the vehicle driving system (containing the engine) remains kept in its torque-down state and as a result the vehicle driving system cannot be put into an engine power output state suited for vehicle-driving operation, thereby resulting in a lack of engine power output, that is, a deterioration in vehicle driveability and/or impossible vehicle running.

In contrast to the above, in the control system of the first embodiment, immediately when engine speed Ne reaches first predetermined engine speed Ne1 at the time t3 with an engine speed rise after the engine restart at the time t1, this system permits idling-stop cancellation control of engine E to be executed regardless of the detected value of hydraulic pressure sensor 10 (see the flow from step S17 to step S16 in FIG. 2 and see the transition from inhibition to permission of idling-stop cancellation control in FIG. 3D).

Therefore, even when the detected value of hydraulic pressure sensor 10 has become minimum at the time t2 due to the broken hydraulic pressure sensor system failure, the control system of the embodiment can execute idling-stop cancellation control on condition that engine speed Ne becomes greater than or equal to first predetermined engine speed Ne1. As previously described, this condition defined by the inequality Ne≧Ne1, means that the actual hydraulic pressure used for shift control (the actual shift control pressure Pc, which is originated from hydraulic pressure of working oil discharged from engine-driven oil pump 4) has already been produced and develops adequately. Thus, the control system of the first embodiment can appropriately increase an engine power output from the torque-down value to an engine output torque value suited for vehicle-driving operation from the point in time (the timing t3) when engine speed Ne reaches predetermined first engine speed Ne1 (see the engine torque rise from the time t3 in FIG. 3E).

The transmission itself can be shifted to the power-transmission enabling state, since shift control pressure Pc, originated from hydraulic pressure of working oil discharged from engine-driven oil pump 4, continues to rise as indicated by the two-dotted line in FIG. 3C even when the detected value of hydraulic pressure sensor 10 has been kept minimum due to such a broken hydraulic pressure sensor system failure.

As discussed above, according to the control system of the first embodiment, it is possible to execute idling-stop cancellation control and to appropriately increase an engine power output (an engine output torque) from the torque-down state regardless of the detected value of hydraulic pressure sensor 10, under the condition defined by the inequality Ne≧Ne1, thus avoiding undesirable problems (e.g., a deterioration in vehicle driveability and/or impossible vehicle running) occurring due to a broken hydraulic pressure sensor system failure.

In contrast to breaking of the hydraulic pressure sensor signal line of hydraulic pressure sensor 10, assume that short-circuiting of the hydraulic pressure sensor signal line of hydraulic pressure sensor 10 occurs and thus the detected value of hydraulic pressure sensor 10 exhibits a maximum value. In such a case, the idling-stop cancellation control routine, executed by the control system of the first embodiment, flows from step S13 to step S17. Hence, the control system of the first embodiment inhibits (disables) idling-stop cancellation control, such that the vehicle driving system (containing engine E) remains kept in its torque-down state regardless of the detected value of hydraulic pressure sensor 10, until engine speed Ne reaches first predetermined engine speed Ne1 and thus the actual hydraulic pressure used for shift control (the actual shift control pressure Pc, originated from hydraulic pressure of working oil discharged from engine-driven oil pump 4) develops adequately (see the flow from step S17 through step S18 back again to step S17). In the same manner as the presence of a broken hydraulic pressure sensor system failure, even in the presence of a short-circuited hydraulic pressure sensor system failure, the control system of the first embodiment also permits execution of idling-stop cancellation control (that is, return of engine E from the torque-down state (the torque-decrease state) to the torque-increase state) at the time t3 when engine speed Ne becomes greater than or equal to first predetermined engine speed Ne1, regardless of the detected value of hydraulic pressure sensor 10. In other words, even in the presence of a short-circuited hydraulic pressure sensor system failure, the control system of the first embodiment inhibits the engine torque-down control, and permits execution of idling-stop cancellation control (that is, return-to-torque-increase) on condition that engine speed Ne becomes greater than or equal to first predetermined engine speed Ne1, regardless of the detected value of hydraulic pressure sensor 10.

Therefore, even in the presence of a shirt-circuited hydraulic pressure sensor system failure that there is a less development of the actual shift control pressure Pc but the detected value of hydraulic pressure sensor 10 becomes maximum, the control system of the first embodiment can prevent idling-stop cancellation control (return-to-torque-increase) from being undesirably permitted based on only the detected value of hydraulic pressure sensor 10. That is, the control system of the first embodiment can avoid the problem that there is a less development in the actual shift control pressure Pc and thus the transmission is out of the power-transmission enabling state, nevertheless idling-stop cancellation control (return-to-torque-increase) is undesirably executed, thus avoiding an undesirable problem (e.g., a deterioration in the durability of the transmission) occurring due to a short-circuited hydraulic pressure sensor system failure.

According to the idling-stop cancellation control apparatus of the first embodiment, which is configured to make a decision, based on engine speed Ne, on whether execution of idling-stop cancellation control should be permitted (enabled) or inhibited (disabled) (see the flow from step S17 to step S16), under a particular condition where a hydraulic pressure sensor system failure occurs (see the flow from step S13 to step S17), it is possible to achieve the following operation and effects, in addition to avoidance of the previously-discussed problems occurring due to breaking/short-circuiting of the hydraulic pressure sensor signal line.

That is, in making a decision, based on engine speed Ne, on whether execution of idling-stop cancellation control should be permitted (enabled) or inhibited (disabled), engine speed Ne is used for shift-control-pressure estimation to the backbone. Such a decision based on engine speed Ne is inferior to a decision based on the detected value of hydraulic pressure sensor 10 in accuracy. For this reason, the control system of the first embodiment is configured to make a decision, based on engine speed Ne, on whether execution of idling-stop cancellation control should be permitted or inhibited, only when it is determined that a failure of the hydraulic pressure sensor system including at least hydraulic pressure sensor 10 occurs (see the flow from step S13 via step S17 to step S16 in FIG. 2). The control system of the first embodiment is also configured to make a decision, based on the detected value of hydraulic pressure sensor 10, on whether execution of idling-stop cancellation control should be permitted or inhibited, when it is determined that a failure of the hydraulic pressure sensor system including at least hydraulic pressure sensor 10 does not occur.

Accordingly, in the absence of a failure of the hydraulic pressure sensor system including at least hydraulic pressure sensor 10, it is possible to make a high-precision decision, based on the detected value of hydraulic pressure sensor 10, on whether execution of idling-stop cancellation control (return-to-torque-increase) should be permitted or inhibited.

Conversely in the presence of a failure of the hydraulic pressure sensor system including at least hydraulic pressure sensor 10, it is possible to make a decision, based on engine speed Ne, on whether execution of idling-stop cancellation control (return-to-torque-increase) should be permitted or inhibited, thus more certainly avoiding the previously-discussed problems (e.g., a deterioration in vehicle driveability and/or impossible vehicle running due to a broken hydraulic pressure sensor system failure and a deterioration in the durability of the transmission due to a short-circuited hydraulic pressure sensor system failure) from occurring.

Figure 4:
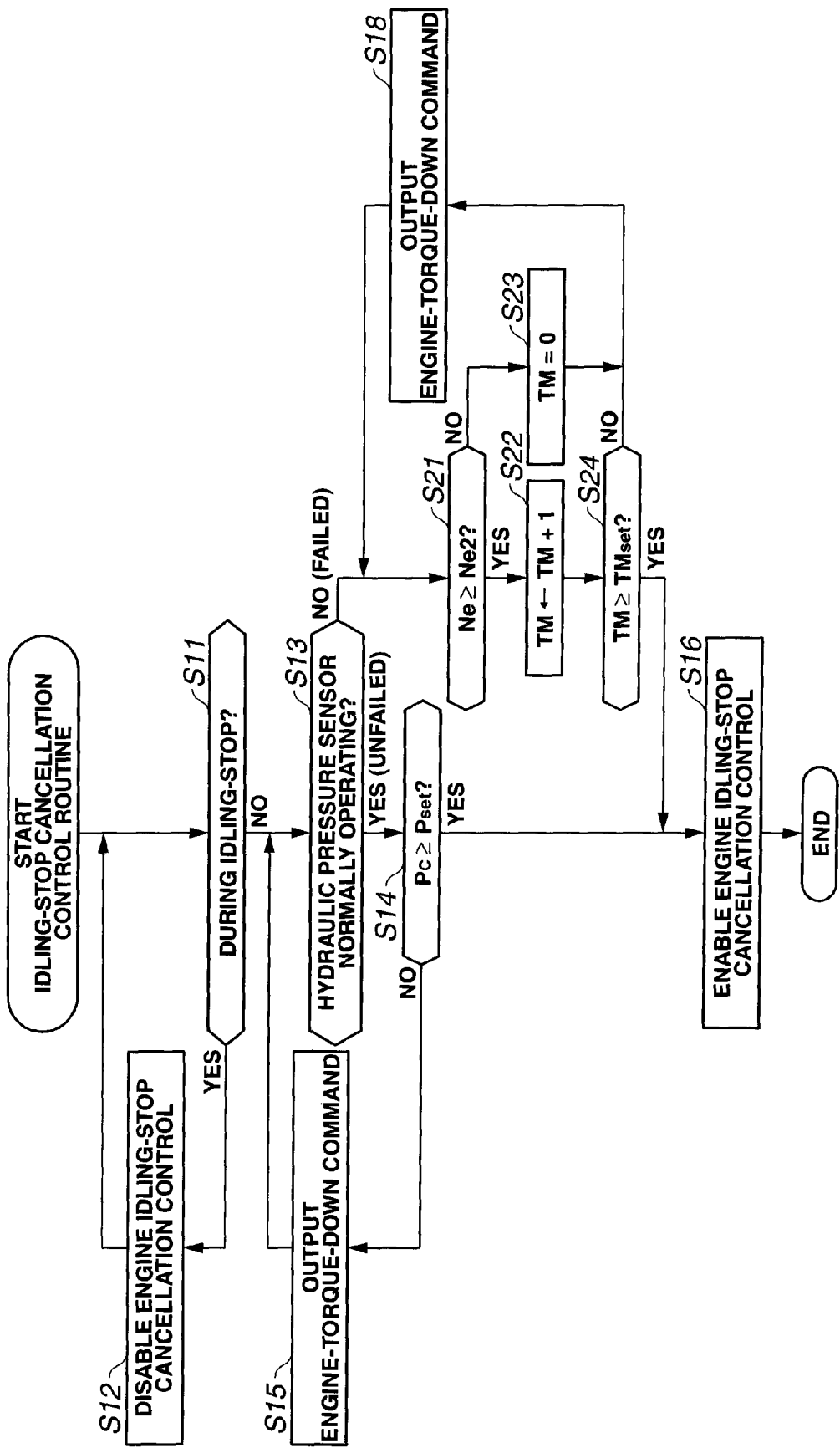
FIG. 4 is a flowchart illustrating a modified idling-stop cancellation control routine executed within an engine auto-stop controller incorporated in the idling-stop cancellation control apparatus of the second embodiment.

Referring now to FIG. 4, there is shown the idling-stop cancellation control routine executed within engine auto-stop controller 15 incorporated in the idling-stop cancellation control apparatus of the second embodiment. The routine shown in FIG. 4 is also executed as time-triggered interrupt routines to be triggered every predetermined time intervals. The idling-stop cancellation control routine of FIG. 4 is similar to the control routine of FIG. 2, except that step S17 included in the routine shown in FIG. 2 is replaced with steps S21-S24 included in the routine shown in FIG. 4. Thus, the same step numbers used to designate steps in the routine shown in FIG. 2 will be applied to the corresponding step numbers used in the routine shown in FIG. 4, for the purpose of comparison of the two different interrupt routines. Steps S21-S24 will be hereinafter described in detail with reference to the accompanying drawings, while detailed description of steps S11-S16 and S18 will be omitted because the above description thereon seems to be self-explanatory.

When the answer to step S13 is negative (NO), that is, when controller 15 determines that hydraulic pressure sensor 10 is abnormally operating and thus a failure in the hydraulic pressure sensor system occurs, the routine proceeds from step S13 to step S21.

At step S21, a check is made to determine whether engine speed Ne is greater than or equal to a second predetermined engine speed Ne2 (i.e., a second engine-speed threshold value). The second predetermined engine speed Ne2 is preset to an engine speed lower than the previously-discussed first predetermined engine speed Ne1, that is, Ne2<Ne1.

In order to more certainly achieve the later-mentioned operation and effects, second predetermined engine speed Ne2 is preset to a minimum engine speed (for instance, an engine idling speed), which is needed to produce a minimum hydraulic pressure used for shift control (a minimum shift-control pressure Pc) by means of engine-driven oil pump 4.

When the answer to step S21 is negative (NO), that is, when Ne<Ne2, the routine proceeds from step S21 via step S23 to step S18, and returns again to step S21. That is, the return flow to step S21 via steps S23 and S18 is repeatedly executed, until engine speed Ne reaches second predetermined engine speed Ne2. At step S23, the count value of a timer TM is reset to "0".

Timer TM is provided to count a duration of the condition defined by the inequality Ne≧Ne2 from a point in time when the condition defined by the inequality Ne≧Ne2 becomes satisfied.

Conversely when the answer to step S21 is affirmative (YES), that is, when Ne≧Ne2, the routine flows from step S21 via step S22 to step S24.

At step S22, the count value of timer TM is repeatedly incremented at each execution cycle, on condition that the answer to step S21 is affirmative (YES). Subsequently to step S22, step S24 occurs.

At step S24, a check is made to determine whether the count value of timer TM (that is, the duration of the condition defined by the inequality Ne≧Ne2) reaches a set-up time TMset.

In order to more certainly achieve the later-mentioned operation and effects, set-up time TMset is preset to a time length that permits engine speed Ne to be satisfactorily risen up to second predetermined engine speed Ne2 after a restart of engine E, which restart is triggered off by idling-stop inhibition (that is, by an output of the idling-stop OFF command).

While the answer to step S21 is in the negative, that is, the condition defined by the inequality Ne≧Ne2 is unsatisfied, or while the answer to step S21 is in the affirmative (that is, the condition defined by the inequality Ne≧Ne2 is satisfied) but the answer to step S24 is in the negative (that is, the condition defined by the inequality TM≧TMset is unsatisfied, the routine proceeds to step S18.

At step S18 of FIG. 4, in a similar manner to step S15 of FIG. 4, controller 15 generates an engine-torque-down command to the engine side so as to suppress or avoid engine power (engine output torque) from exerting a bad influence on the durability of the transmission even under a low engine speed Ne (<Ne2), in other words, even under a low hydraulic pressure used for shift control, that is, even under low shift-control pressure Pc (<Pset) produced with engine E running at low engine speeds (see an engine-torque-down command generated from engine auto-stop controller 15 in FIG. 1).

After step S18 of FIG. 4, the routine returns to step S21. The above-mentioned engine torque-down control is continuously executed, until step S21 determines that the condition defined by the inequality Ne≧Ne2 becomes satisfied and step S24 determines that the condition defined by the inequality TM≧TMset becomes satisfied.

As soon as step S21 determines that the condition defined by the inequality Ne≧Ne2 becomes satisfied and step S24 determines that the condition defined by the inequality TM≧TMset becomes satisfied, the routine advances to step S16. Through step S16, controller 15 terminates the previously-noted engine-torque-down control and permits engine-idling-stop cancellation control, such that engine power (engine output torque) gradually develops and rises up to an engine output torque value suited for vehicle-driving operation (for usual vehicle running). Therefore, steps S21-S24, together with step S16, construct or function as first idling-stop cancellation control means (or a first idling-stop cancellation control section incorporated in the control system of the second embodiment and configured to execute, based on engine speed Ne, idling-stop cancellation control) by which it is possible to more certainly prevent an undesirable input of engine power to the CVT, not yet changed to the power-transmission enabling state, just after engine-restart operation, even in the presence of a failure in the hydraulic pressure sensor system. On the other hand, step S14, together with step S16, constructs or functions as second idling-stop cancellation control means (or a second idling-stop cancellation control section incorporated in the control system of the second embodiment and configured to execute, based on the detected value of hydraulic pressure sensor 10, idling-stop cancellation control) by which it is possible to more certainly prevent an undesirable input of engine power to the CVT, not yet changed to the power-transmission enabling state, just after engine-restart operation, in the absence of a failure in the hydraulic pressure sensor system.

Referring now to FIGS. 5A-5F, there are shown the time charts related to the idling-stop cancellation control routine of FIG. 4.

The time charts of FIGS. 5A-5F show the simulation results, obtained by the control system of the idling-stop cancellation control apparatus of the second embodiment, under the following test condition. That is, engine E is restarted in response to an idling-stop OFF command at the time t1 (see FIG. 5A), and thus engine speed Ne begins to rise from the time t1 with a change in time series as shown in FIG. 5B. With the engine speed rise with the time-series change, shift control pressure Pc, which is originated from hydraulic pressure of working oil discharged from engine-driven oil pump 4, also begins to rise just after the time t1 (see the shift-control-pressure rise indicated by the two-dotted line in FIG. 5D. Thereafter, assume that shift control pressure Pc continues to rise after the time t2, but breaking of the hydraulic pressure sensor signal line of hydraulic pressure sensor 10, which is provided for detecting shift control pressure Pc, occurs at the time t2, and thus the detected value of hydraulic pressure sensor 10 exhibits a minimum value from the time t2.

In the control system of the second embodiment, immediately when engine speed Ne reaches second predetermined engine speed Ne2 (<Ne1), which is preset to a speed value lower than first predetermined engine speed Ne1 used in the control system of the first embodiment, at the time t2' with an engine speed rise after the engine restart at the time t1, timer TM starts to count a duration of the condition defined by the inequality Ne≧Ne2 from the time t2' when the condition defined by the inequality Ne≧Ne2 becomes satisfied (see the flow from step S21 to step S22 and see FIGS. 5B-5C). Immediately when the duration (i.e., the count value of timer TM) reaches set-up time TMset at the time t3' (see FIG. 5C), this system permits idling-stop cancellation control of engine E to be executed regardless of the detected value of hydraulic pressure sensor 10 (see the flow from step S24 to step S16 in FIG. 4 and see the transition from inhibition to permission of idling-stop cancellation control in FIG. 5E).

Therefore, even when the detected value of hydraulic pressure sensor 10 has become minimum at the time t2 due to the broken hydraulic pressure sensor system failure, the control system of the second embodiment can execute idling-stop cancellation control on condition that the condition defined by the inequality Ne≧Ne2 continues for the set-up time TMset. As previously described, this condition defined by the inequality Ne≧Ne2 and the inequality TM≧TMset, means that the actual hydraulic pressure used for shift control (the actual shift control pressure Pc, which is originated from hydraulic pressure of working oil discharged from engine-driven oil pump 4) has already been produced and develops adequately. Thus, the control system of the second embodiment can appropriately increase an engine power output from the torque-down value to an engine output torque value suited for vehicle-driving operation from the point of time t3' when the duration (i.e., the count value of timer TM) of the condition defined by the inequality Ne≧Ne2 reaches set-up time TMset (see the engine torque rise from the time t3' in FIG. 5F).

The transmission itself can be shifted to the power-transmission enabling state, since shift control pressure Pc, originated from hydraulic pressure of working oil discharged from engine-driven oil pump 4, continues to rise as indicated by the two-dotted line in FIG. 5D even when the detected value of hydraulic pressure sensor 10 has been kept minimum due to such a broken hydraulic pressure sensor system failure.

As discussed above, according to the control system of the second embodiment, it is possible to execute idling-stop cancellation control and to appropriately increase an engine power output from the torque-down state under the condition defined by the inequality Ne≧Ne2 and the inequality TM≧TMset, regardless of the detected value of hydraulic pressure sensor 10, thus avoiding undesirable problems (e.g., a deterioration in vehicle driveability and/or impossible vehicle running) occurring due to a broken hydraulic pressure sensor system failure.

In contrast to breaking of the hydraulic pressure sensor signal line of hydraulic pressure sensor 10, assume that short-circuiting of the hydraulic pressure sensor signal line of hydraulic pressure sensor 10 occurs and thus the detected value of hydraulic pressure sensor 10 exhibits a maximum value. In such a case, the idling-stop cancellation control routine, executed by the control system of the second embodiment, flows from step S13 to step S21. Hence, the control system of the second embodiment inhibits (disables) idling-stop cancellation control (i.e., restarting of engine E), such that the vehicle driving system (containing engine E) remains kept in its torque-down state regardless of the detected value of hydraulic pressure sensor 10, until it is determined that engine speed Ne is continuously maintained at a speed value greater than or equal to second predetermined engine speed Ne2 for the set-up time TMset and thus the actual hydraulic pressure used for shift control (the actual shift control pressure Pc, originated from hydraulic pressure of working oil discharged from engine-driven oil pump 4) develops adequately (see the flow from step S21 via step S23 through step S18 back again to step S21). In the same manner as the presence of a broken hydraulic pressure sensor system failure, even in the presence of a short-circuited hydraulic pressure sensor system failure, the control system of the second embodiment also permits execution of idling-stop cancellation control (that is, return of engine E from the torque-down state to the torque-increase state) at the time t3' when it is determined that engine speed Ne is continuously maintained at a speed value greater than or equal to second predetermined engine speed Ne2 for the set-up time TMset, regardless of the detected value of hydraulic pressure sensor 10. In other words, even in the presence of a short-circuited hydraulic pressure sensor system failure, the control system of the second embodiment inhibits the engine torque-down control, and permits execution of idling-stop cancellation control (that is, return-to-torque-increase) on condition that engine speed Ne becomes greater than or equal to second predetermined engine speed Ne2 and the duration (i.e., the count value of timer TM) becomes greater than or equal to set-up time TMset, regardless of the detected value of hydraulic pressure sensor 10.

Therefore, even in the presence of a shirt-circuited hydraulic pressure sensor system failure that there is a less development of the actual shift control pressure Pc but the detected value of hydraulic pressure sensor 10 becomes maximum, the control system of the second embodiment can prevent idling-stop cancellation control (return-to-torque-increase) from being undesirably permitted based on only the detected value of hydraulic pressure sensor 10. That is, the control system of the second embodiment can avoid the problem that there is a less development in the actual shift control pressure Pc and thus the transmission is out of the power-transmission enabling state, nevertheless idling-stop cancellation control (return-to-torque-increase) is undesirably executed, thus avoiding an undesirable problem (e.g., a deterioration in the durability of the transmission) occurring due to a short-circuited hydraulic pressure sensor system failure.

In the case of the control system of the first embodiment, which is configured to permit execution of idling-stop cancellation control regardless of the detected value of hydraulic pressure sensor 10 on condition that engine speed Ne becomes greater than or equal to first predetermined engine speed Ne1 (see step S17 of FIG. 2), the previously-described safety margin is added to the minimum engine speed (e.g., an idle speed). Such a safety margin has to be partly connoted or involved in first predetermined engine speed Ne1, for enhancing the accuracy of decision on whether the hydraulic pressure used for shift control (i.e., shift-control pressure Pc) develops sufficiently such that there is a less tendency for the durability of the transmission to be harmfully affected by an undesirable input of engine power to the transmission. As a result of addition of the safety margin, first predetermined engine speed Ne1 has to be preset to a high speed value. For the reasons discussed above, the timing (see the time t3 of FIGS. 3D-3E and FIGS. 5E-5F), at which the control system of the first embodiment permits idling-stop cancellation control to be executed and simultaneously engine power (engine output torque) starts to rise up to an engine output torque value suited for vehicle-driving operation, tends to be greatly affected by a time rate (i.e., dNe/dt) of increase in engine speed Ne (in other words, en engine-speed rise speed). For instance, assuming that the time rate (i.e., dNe/dt) of increase in engine speed Ne is low, the timing of permission of idling-stop cancellation control tends to retard. As set forth above, in the system of the first embodiment, a predetermined condition (exactly, a second predetermined condition), under which idling-stop cancellation control is permitted and executed to put the vehicle driving system (containing engine E) into a state suited for vehicle-driving operation (exactly, an engine power output state suited for vehicle-driving operation), corresponds to either (i) a condition that the detected value of hydraulic pressure sensor 10, which is provided for detecting a hydraulic pressure used for shift control (i.e., shift control pressure Pc) becomes greater than or equal to a predetermined hydraulic pressure value Pset in the absence of a hydraulic pressure sensor system failure or (ii) a condition that engine speed Ne becomes greater than or equal to first predetermined engine speed Ne1 in the presence of a hydraulic pressure sensor system failure.

In contrast, in the case of the control system of the second embodiment, which is configured to permit execution of idling-stop cancellation control regardless of the detected value of hydraulic pressure sensor 10, when (i) a first permission condition that engine speed Ne becomes greater than or equal to second predetermined engine speed Ne2, which is preset to a speed value lower than first predetermined engine speed Ne1, and (ii) a second permission condition that the first permission condition, defined by the inequality Ne≧Ne2, continues for the set time TMset, are simultaneously satisfied. Hence, the timing (see the time t3' of FIGS. 5E-5F), at which the control system of the second embodiment permits idling-stop cancellation control to be executed and simultaneously engine power (engine output torque) starts to rise up to an engine output torque value suited for vehicle-driving operation, cannot be greatly affected by a time rate (i.e., dNe/dt) of increase in engine speed Ne. Therefore, even when the time rate (i.e., dNe/dt) of increase in engine speed Ne is low, the control system of the second embodiment can permit idling-stop cancellation control to be executed at the earlier timing t3' (than the time t3 of FIGS. 5E-5F), thereby enabling engine power (engine output torque) to be rapidly risen from the torque-down value up to an engine output torque value suited for vehicle-driving operation. As explained above, that is, as can be appreciated from the timing t3' of inhibition of torque-down control and permission of idling-stop cancellation control, phase-advanced from the timing t3, the system of the second embodiment is superior to the system of the first embodiment in rapid and high-precision decision on whether the hydraulic pressure used for shift control (i.e., shift-control pressure Pc) develops sufficiently such that there is a less tendency for the durability of the transmission to be harmfully affected by an undesirable input of engine power to the transmission. As set forth above, in the system of the second embodiment, a predetermined condition, under (exactly, a second predetermined condition) which idling-stop cancellation control is permitted and executed to put the vehicle driving system (containing engine E) into a state suited for vehicle-driving operation (exactly, an engine power output state suited for vehicle-driving operation), corresponds to either (i) a condition that the detected value of hydraulic pressure sensor 10, which is provided for detecting a hydraulic pressure used for shift control (i.e., shift control pressure Pc) becomes greater than or equal to a predetermined hydraulic pressure value Pset in the absence of a hydraulic pressure sensor system failure or (ii) a condition that a state where engine speed Ne is greater than or equal to second predetermined engine speed Ne2 continues for set-up time TMset in the presence of a hydraulic pressure sensor system failure.

In the shown embodiments, the idling-stop cancellation control apparatus of the vehicle driving system is exemplified in an idling-stop control device equipped automotive vehicle on which a belt-drive continuously variable automatic transmission (CVT) is mounted. It will be appreciated that the transmission is not limited to such a belt-drive CVT. In lieu thereof, the idling-stop cancellation control apparatus of the invention may be applied to an idling-stop control device equipped automotive vehicle employing another type of transmission, for example, a stepped automatic transmission, whose number of speeds is limited or finite, or an automated manual transmission, in which rotation of an engine is inputted through an automatic clutch, a desired shift stage is realized by automatic-clutch engagement/disengagement control and gear shifting for a changeover in a transmission gear train, using at least working oil from an engine-driven oil pump as a working medium, and the input rotation from the engine is speed-changed based on the realized shift stage.

The entire contents of Japanese Patent Application No. 2008-145230 (filed Jun. 3, 2008) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An idling-stop cancellation control apparatus of a vehicle driving system of an automotive vehicle capable of running by a power produced by an engine and transmitted via a transmission whose shift is controlled by a hydraulic pressure produced by an engine-driven oil pump during operation of the engine, comprising:

a hydraulic pressure sensor provided for detecting a hydraulic pressure used for shift control of the transmission; and an idling-stop control device configured to execute idling-stop operation by which the engine is automatically stopped when a predetermined condition is satisfied under a state where a stop of the vehicle has been decided, and also configured to inhibit the idling-stop operation to restart the engine when the predetermined condition becomes unsatisfied, the idling-stop control device comprising:

a normal idling-stop cancellation control section configured to execute idling-stop cancellation control by which the vehicle driving system is put into a state suited for vehicle-driving operation, when a detected value of the hydraulic pressure sensor becomes greater than or equal to a predetermined pressure value; and an emergency idling-stop cancellation control section configured to execute idling-stop cancellation control of the vehicle driving system regardless of the detected value of the hydraulic pressure sensor, when a speed of the engine becomes greater than or equal to a first engine-speed threshold value.

2. The idling-stop cancellation control apparatus as claimed in claim 1, wherein:
the emergency idling-stop cancellation control section is configured to permit the idling-stop cancellation control to be executed on condition that the engine speed is continuously maintained at a speed value greater than or equal to a second engine-speed threshold value less than the first threshold value for a set-up time, instead of using the condition that the engine speed becomes greater than or equal to the first threshold value.

3. The idling-stop cancellation control apparatus as claimed in claim 2, wherein:
the second threshold value is preset to a minimum engine speed, which is needed to produce a minimum hydraulic pressure used for shift control of the transmission by means of the engine-driven oil pump.

4. The idling-stop cancellation control apparatus as claimed in claim 3, wherein:
the second threshold value is preset to an engine idling speed.

5. The idling-stop cancellation control apparatus as claimed in claim 3, wherein:
the set-up time is preset to a time length that permits a given pressure build-up of the hydraulic pressure used for shift control of the transmission, from a point of time when the engine speed has risen up to the second threshold value after the engine has been restarted by inhibiting the idling-stop operation.

6. The idling-stop cancellation control apparatus as claimed in claim 2, wherein:
the first threshold value is preset to a summed value of the second threshold value and a safety margin for prevention of an erroneous decision.

7. The idling-stop cancellation control apparatus as claimed in claim 1, wherein:
the first threshold value is preset to an engine speed suited for a moderate vehicle- starting period required hydraulic pressure, which pressure is needed to produce a hydraulic pressure used for shift control of the transmission and required for moderately starting the vehicle.

8. The idling-stop cancellation control apparatus as claimed in claim 1, wherein:
the idling-stop control device is further configured to execute torque-down control of the engine before the detected value of the hydraulic pressure sensor becomes greater than or equal to the predetermined pressure value after the engine has been restarted by inhibiting the idling-stop operation, and
the emergency idling-stop cancellation control section is configured to execute, based on the detected value of the hydraulic pressure sensor, idling-stop cancellation control so as to put the engine into an output torque state suited for vehicle-driving operation by inhibiting the torque-down control, when the detected value of the hydraulic pressure sensor becomes greater than or equal to the predetermined pressure value.

9. The idling-stop cancellation control apparatus as claimed in claim 1, further comprising:
a hydraulic pressure sensor system failure detector provided for detecting whether a sensor system of the hydraulic pressure sensor is failed or unfailed,
wherein the idling-stop cancellation control, which is based on the engine speed, is executed by the emergency idling-stop cancellation control section of the idling-stop control device, only when the hydraulic pressure sensor system is failed.

10. A control method of a vehicle driving system of an idling-stop control device equipped automotive vehicle capable of running by a power produced by an engine and transmitted via a transmission whose shift is controlled by a hydraulic pressure produced by an engine-driven oil pump during operation of the engine, comprising:
detecting a hydraulic pressure used for shift control of the transmission;
detecting a speed of the engine;
executing idling-stop operation by which the engine is automatically stopped when a predetermined condition is satisfied under a state where a stop of the vehicle has been decided;
inhibiting the idling-stop operation to restart the engine when the predetermined condition becomes unsatisfied;
executing, based on the detected hydraulic pressure idling-stop cancellation control by which the vehicle driving system is put into an output torque state suited for vehicle-driving operation, when a hydraulic pressure sensor system provided for detecting the hydraulic pressure is unfailed and the detected hydraulic pressure becomes greater than or equal to a predetermined pressure value;
executing, based on the engine speed, idling-stop cancellation control of the vehicle driving system regardless of the detected hydraulic pressure, when the hydraulic pressure sensor system is failed and the engine speed becomes greater than or equal to a first engine-speed threshold value.

11. The control method as claimed in claim 10, wherein:
the idling-stop cancellation control, which is based on the engine speed, is executed on condition that the engine speed is continuously maintained at a speed value greater than or equal to a second engine-speed threshold value less than the first threshold value for a set-up time, instead of using the condition that the engine speed becomes greater than or equal to the first threshold value.

12. The control method as claimed in claim 11, wherein:
the second threshold value is preset to a minimum engine speed, which is needed to produce a minimum hydraulic pressure used for shift control of the transmission by means of the engine-driven oil pump.

13. The control method as claimed in claim 12, wherein:
the second threshold value is preset to an engine idling speed.

14. The control method as claimed in claim 12, wherein:
the set-up time is preset to a time length that permits a given pressure build-up of the hydraulic pressure used for shift control of the transmission, from a point of time when the engine speed has risen up to the second threshold value after the engine has been restarted by inhibiting the idling-stop operation.

15. The control method as claimed in claim 11, wherein:
the first threshold value is preset to summed value of the second threshold value and a safety margin for prevention of an erroneous decision.

16. The control method as claimed in claim 10, wherein:
the first threshold value is preset to an engine speed suited for a moderate vehicle-starting period required hydraulic pressure, which pressure is needed to produce a hydraulic pressure used for shift control of the transmission and required for moderately starting the vehicle.

17. The control method as claimed in claim 11, further comprising:

executing torque-down control of the engine before the hydraulic pressure becomes greater than or equal to the predetermined pressure value after the engine has been restarted by inhibiting the idling-stop operation;

executing the idling-stop cancellation control, which is based on the hydraulic pressure, by inhibiting the torque-down control when the hydraulic pressure becomes greater than or equal to the predetermined pressure value, in the absence of the hydraulic pressure sensor system failure; and executing the idling-stop cancellation control, which is based on the engine speed, by inhibiting the torque-down control when either one of the condition that the engine speed becomes greater than or equal to the first threshold value and the condition that the engine speed is continuously maintained at a speed value greater than or equal to the second threshold value less than the first threshold value for the set-up time is satisfied, in the presence of the hydraulic pressure sensor system failure.

* * * * *